(12) United States Patent
Foster et al.

(10) Patent No.: US 9,621,538 B2
(45) Date of Patent: Apr. 11, 2017

(54) SECURE RESOURCE ACCESS IN A DISTRIBUTED ENVIRONMENT

(75) Inventors: Ward Scott Foster, Boise, ID (US); Robert John Madril, Jr., Boise, ID (US); Shell Sterling Simpson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2573 days.

(21) Appl. No.: 10/192,999

(22) Filed: Jul. 10, 2002

(65) Prior Publication Data

US 2004/0010682 A1 Jan. 15, 2004

(51) Int. Cl.
*H04L 29/06* (2006.01)

(52) U.S. Cl.
CPC .......... *H04L 63/0823* (2013.01); *H04L 63/10* (2013.01); *H04L 63/126* (2013.01)

(58) Field of Classification Search
CPC .... H04L 63/0823; H04L 63/126; H04L 63/10
USPC ........................................ 726/8, 4, 5, 10, 12
See application file for complete search history.

(56) References Cited

U.S. PATENT DOCUMENTS

| | | | |
|---|---|---|---|
| 6,286,104 B1 * | 9/2001 | Buhle et al. | 726/4 |
| 6,671,358 B1 * | 12/2003 | Seidman et al. | 379/93.12 |
| 6,986,040 B1 * | 1/2006 | Kramer et al. | 713/155 |
| 8,438,086 B2 * | 5/2013 | Rosko et al. | 705/35 |
| 2003/0149880 A1 * | 8/2003 | Shamsaasef et al. | 713/182 |

OTHER PUBLICATIONS

Freier et al., "The SSL Protocol Version 3.0", Nov. 18, 1996, pp. 1-30, obtained from http://wp.netscape.com/eng/ssl3/draft302.txt.*
Bea, "Using WebLogic SSL", Mar. 31, 2000, pp. 1-28, obtained from http://www.weblogic.com/docs51/classdocs/API_secure.html.*

* cited by examiner

*Primary Examiner* — Jeffrey D Popham
(74) *Attorney, Agent, or Firm* — HP Inc. Patent Department

(57) ABSTRACT

A method and system for providing a first network resource with secure but limited access to a second network resource. A method embodying the invention includes receiving a request to access the second resource. It is verified that the source of the request is the first resource. It is then verified that the request was originated by a user through, for example, a web browser, and then a user's credentials are authenticated. Only when the request can be properly verified and the user credentials authenticated, is access to the second resource granted. Beneficially, the first resource cannot access the second without the user's knowledge or, at least, implicit consent.

21 Claims, 8 Drawing Sheets

SECURE RESOURCE ACCESS IN A DISTRIBUTED ENVIRONMENT

FIELD OF THE INVENTION

The present invention is directed to a method and system for accessing a distributed resource. More particularly, the invention is directed to a method and system for providing secure but limited access to a resource in a distributed environment.

BACKGROUND OF THE INVENTION

In a basic desktop computing environment, a computer, accessing data from its hard drive, performs a specified function such as word processing, displaying information on a screen, and, when requested, producing a document on a connected printer. In a distributed computing environment, the resources found in the desktop environment are spread across any number of interconnected devices. For example, a client accesses a resource over the Internet. Accessing data provided by the client or located and retrieved from another device, the resource performs specified tasks. These tasks include, among a multitude of others, manipulating the data as instructed, returning the data for use by the client, and/or sending data to a printer for production.

The following provides a more specific example of a distributed computing system utilized to print documents. A client computer, utilizing a web browser and the Internet, accesses a web server providing a document printing resource. The web server may be running on a device connected to or networked with one or more printers. Alternatively, the web server may be embedded in the printer itself. The printing resource locates available printers and a data resource managing electronic documents. The printing service then returns to the browser a graphical interface containing user accessible controls for selecting a document from the data resource as well as controls for selecting a printer. Selections made through the interface are returned to the printing resource. Accessing the data resource, the printing resource retrieves and/or sends the selected document to the selected printer for production.

Accessing distributed resources raises a number of security considerations. Access to a resource may be limited for commercial or privacy purposes. Using the example above, a user may be a paid subscriber enabling access to the printing resource. The user may pay a flat rate or may pay for each use. For commercial security, the user may be required to present credentials such as a user name and password in order to access the printing resource. The same may be true for the data resource. However, presenting credentials to the data resource also promotes user privacy. A user may store documents on the data resource that the user desires to keep private and secure.

Consequently, granting one resource access to another resource compounds the security considerations. Using the example above, a user presents one set of credentials to access the printing resource. The user then provides the printing resource with a second set of credentials needed to access the data resource. Here lies the problem. Conventional communication techniques such as Secure Hypertext Protocol provide the user reasonable assurance that third parties cannot intercept credentials being passed. However, the user has no assurance that the printing resource will not again access the data resource using the provided credentials without user's consent or knowledge.

SUMMARY OF THE INVENTION

Accordingly, the present invention is directed to a method and system for providing a first network resource with secure but limited access to a second network resource. A method embodying the invention includes receiving a request to access the second resource. It is verified that the source of the request is the first resource. It is then verified that the request was originated by a user through, for example, a web browser, and then a user's credentials are authenticated. Only when the request can be properly verified and the user credentials authenticated, is access to the second resource granted. Beneficially, the first resource cannot access the second without the user's knowledge or, at least, implicit consent.

DETAILED DESCRIPTION OF THE INVENTION

Figure 1:
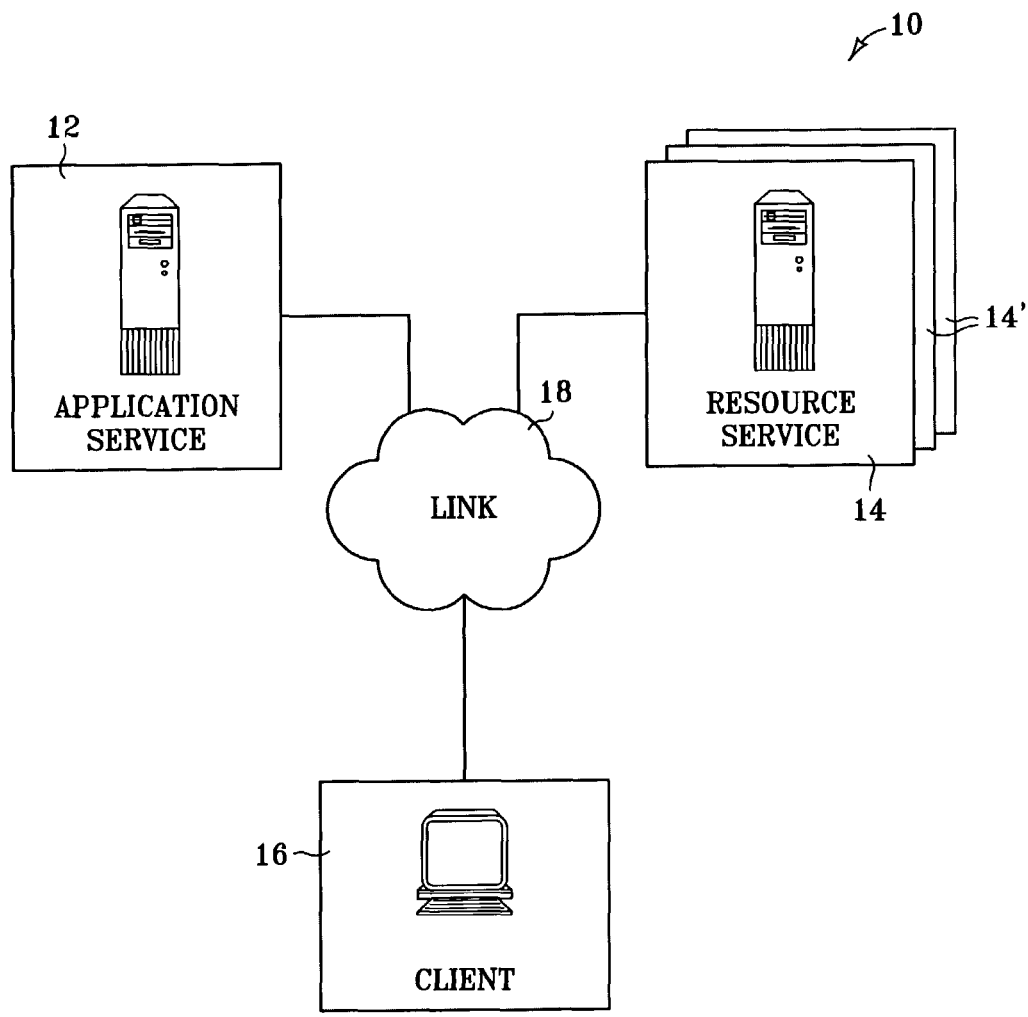
FIG. 1 is a schematic representation of a computer network in which various embodiments of the present invention may be incorporated.

Glossary:

Program: An organized list of electronic instructions that, when executed, causes a device to behave in a predetermined manner. A program can take many forms. For example, it may be software stored on a computer's disk drive. It may be firmware written onto read-only memory. It may be embodied in hardware as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components.

Distributed Environment: A computing environment in which various program elements needed to complete a particular task are running on different but interconnected computing devices. A distributed application is programming operating on one computing device that can be accessed and utilized by or from another computing device.

Client-Server: A model of interaction between two programs. For example, a program operating on one network device sends a request to a program operating on another network device and waits for a response. The requesting program is referred to as the "client" while the device on which the client operates is referred to as the "client device." The responding program is referred to as the "server," while the device on which the server operates is referred to as the "server device." The server is responsible for acting on the client request and returning requested information, if any, back to the client. This requested information may be an electronic file such as a word processing document or spread sheet, a web page, or any other electronic data to be displayed or used by the client. In any given network there may be multiple clients and multiple servers. A single device may contain programming allowing it to operate both as a client device and as a server device. Moreover, a client and a server may both operate on the same device.

Web Server: A server that implements HTTP (Hypertext Transport Protocol). A web server can host a web site or a web service. A web site provides a user interface by supplying web pages to a requesting client, in this case a web browser. Web pages can be delivered in a number of formats including, but not limited to, HTML (Hyper-Text Markup Language) and XML (extensible Markup Language). Web pages may be generated on demand using server side scripting technologies including, but not limited to, ASP (Active Server Pages) and JSP (Java Server Pages). A web page is typically accessed through a network address. The network address can take the form of an URL (Uniform Resource Locator), IP (Internet Protocol) address, or any other unique addressing mechanism. A web service provides a programmatic interface which may be exposed using a variety of protocols layered on top of HTTP, such as SOAP (Simple Object Access Protocol).

Interface: The junction between a user and a computer program providing commands or menus through which a user communicates with the program. The term user in this context represents generally any individual or mechanism desiring to communicate with the program. For example, in the client-server model defined above, the server usually generates and delivers to a client an interface for communicating with a program operating on or controlled by the server device. Where the server is a web server, the interface is a web page. The web page when displayed by the client device presents a user with controls for selecting options, issuing commands, and entering text. The controls displayed can take many forms. They may include push-buttons, radio buttons, text boxes, scroll bars, or pull-down menus accessible using a keyboard and/or a pointing device such as a mouse connected to a client device. In a non-graphical environment, the controls may include command lines allowing the user to enter textual commands.

Session: An instance of the operation of a program under the control of a particular user. For example, a program or application served over the Internet may be accessed by more than one user at one time. Each instance of a user accessing the program is an application session. A session interface then is an interface for interacting with a particular application session.

Digital Certificate: An attachment to an electronic message used for security purposes. The most common use of a digital certificate is to verify that a user sending a message is who he or she claims to be, and to provide the receiver with the means to encode a reply. An individual wishing to send an encrypted message applies for a digital certificate from a Certificate Authority (CA). The CA issues an encrypted digital certificate containing the applicant's public key and a variety of other identification information. The CA makes its own public key readily available through print publicity or perhaps on the Internet. The recipient of an encrypted message uses the CA's public key to decode the digital certificate attached to the message, and verify the certificate as being issued by the CA.

INTRODUCTION: In distributed computing environments, a user employs a client to access a particular application running on a server device. The user directs the application to manipulate electronic data located anywhere on a computer network. To do so, the user must provide the application with the information required to locate and access the data. It is expected that various embodiments of the present invention will enable the provision of this information with minimal user interaction while maintaining the user's security and privacy.

Although the various embodiments of the invention disclosed herein will be described with reference to the computer network 10 shown schematically in FIG. 1, the invention is not limited to use with network 10. The invention may be implemented in or used with any computer system in which it is necessary or desirable to access electronic data. The following description and the drawings illustrate only a few exemplary embodiments of the invention. Other embodiments, forms, and details may be made without departing from the spirit and scope of the invention, which is expressed in the claims that follow this description.

Referring to FIG. 1, computer network 10 represents generally any local or wide area network in which a variety of different electronic devices are linked. Network 10 includes application service 12, resource service 14, and client 16 all interconnected by link 18. Application service 12 represents generally any combination of programming and/or hardware capable of distributing an application over network 10. Resource service 14 represents any combination of hardware and/or programming capable of providing a resource to a distributed application. Client 16 represents any combination of hardware and/or programming capable of interacting with application service 12 and resource service 14. Network 10 may also include one or more additional resource services 14.

Link 18 interconnects devices 12-16 and represents generally a cable, wireless, or remote connection via a telecommunication link, an infrared link, a radio frequency link, or any other connector or system that provides electronic communication between devices 12-16. Link 18 may represent an intranet, an Internet, or a combination of both. Devices 12-16 can be connected to the network 10 at any point and the appropriate communication path established logically between the devices.

COMPONENTS: The logical components of one embodiment of the invented data access system will now be described with reference to the block diagram of FIG. 2. Application service 12 includes application 20, application server 22, and resource module 24. Application 20 represents generally any application capable of being distributed over network 10. Application server 22 represents generally any programming capable of distributing application 20. Application server 22 is also capable of generating or otherwise providing a session interface to be displayed by client 16 enabling a user to interact with application 20. Resource module 24 represents generally any programming capable interacting with resource service 14. Resource module 24 is also capable of providing content for a session interface enabling a user to interact with resource service 14.

Resource service 14 includes resource 26, resource server 28, and verifier 30. Resource 26 represents generally any programming and/or electronic data capable of being accessed and utilized over network 10. Resource server 28 represents any programming capable of making resource 26 available over network 10. Verifier 30 represents any programming capable of limiting access to resource 26 to those providing verifiable credentials.

It is expected that servers 22 and 28 will be web servers. Application 20 and resource 26, then, may be web sites, web services, or a combination of the two. Client 16 contains browser 31 capable of communicating with servers 22 and 28. Alternatively, in some instances, servers 22 and 28 may be accessed or communicated with programmatically—not using browser 31.

Figure 3:
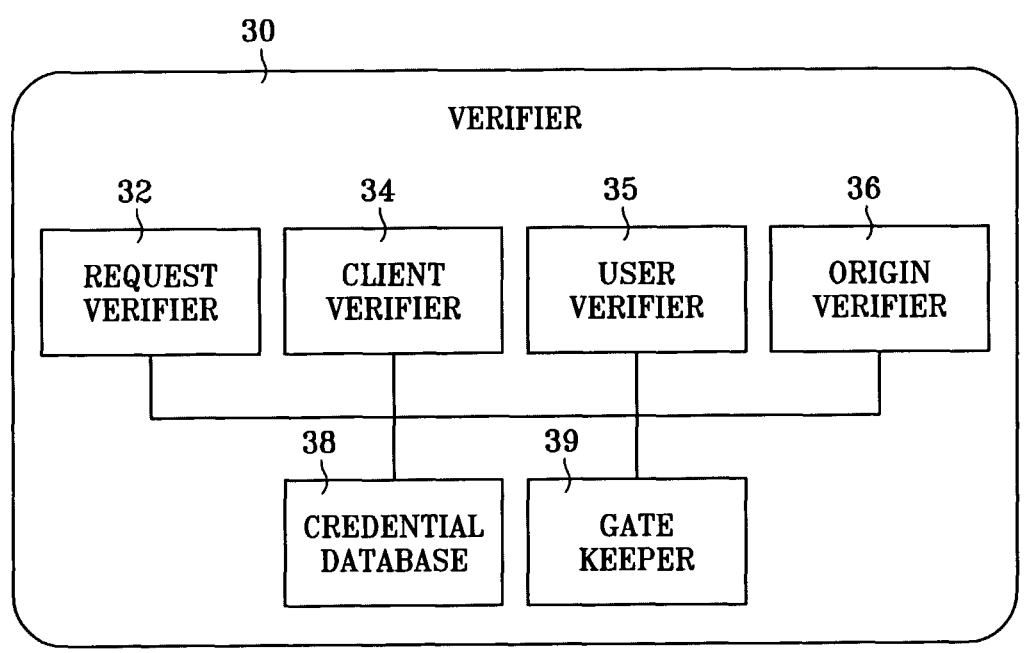
FIG. 3 is a block diagram illustrating the logical components of the verifier according to an embodiment of the present invention.

Referring now to FIG. 3, verifier 30 includes request verifier 32, client verifier 34, user verifier 35, origin verifier 36, credential database 38, and gate keeper 39. Request verifier 32 represents any programming capable of verifying that a request to access resource 26 was, in fact, received from a verifiable source. It is expected that request verifier 32 will include programming for authenticating credentials presented by application service 12. Similarly, client verifier 34 represents any programming capable of authenticating credentials presented by client 16. User verifier 35 represents generally any programming capable of authenticating a user's credentials such as a user name and password. Origin verifier 36 represents any programming capable of verifying that a request to access resource 26 originated from a user. In other words, origin verifier 36 includes programming capable of verifying that a user directed application service 12 to request access to resource 26. The term "user" in this case includes client 16, browser 31, and/or an individual. It is expected that origin verifier's programming will be capable of matching a request made by application service 12 with a request made by client 16. Credential database 38 represents any logical memory containing data which request verifier 32 and client verifier 34 can use to evaluate credentials presented by application service 12 and client 16. Gate keeper 39 represents any programming capable of granting a request to access to resource 26 only where the source and origin of the request are verified and user credentials are authenticated.

Figure 2:
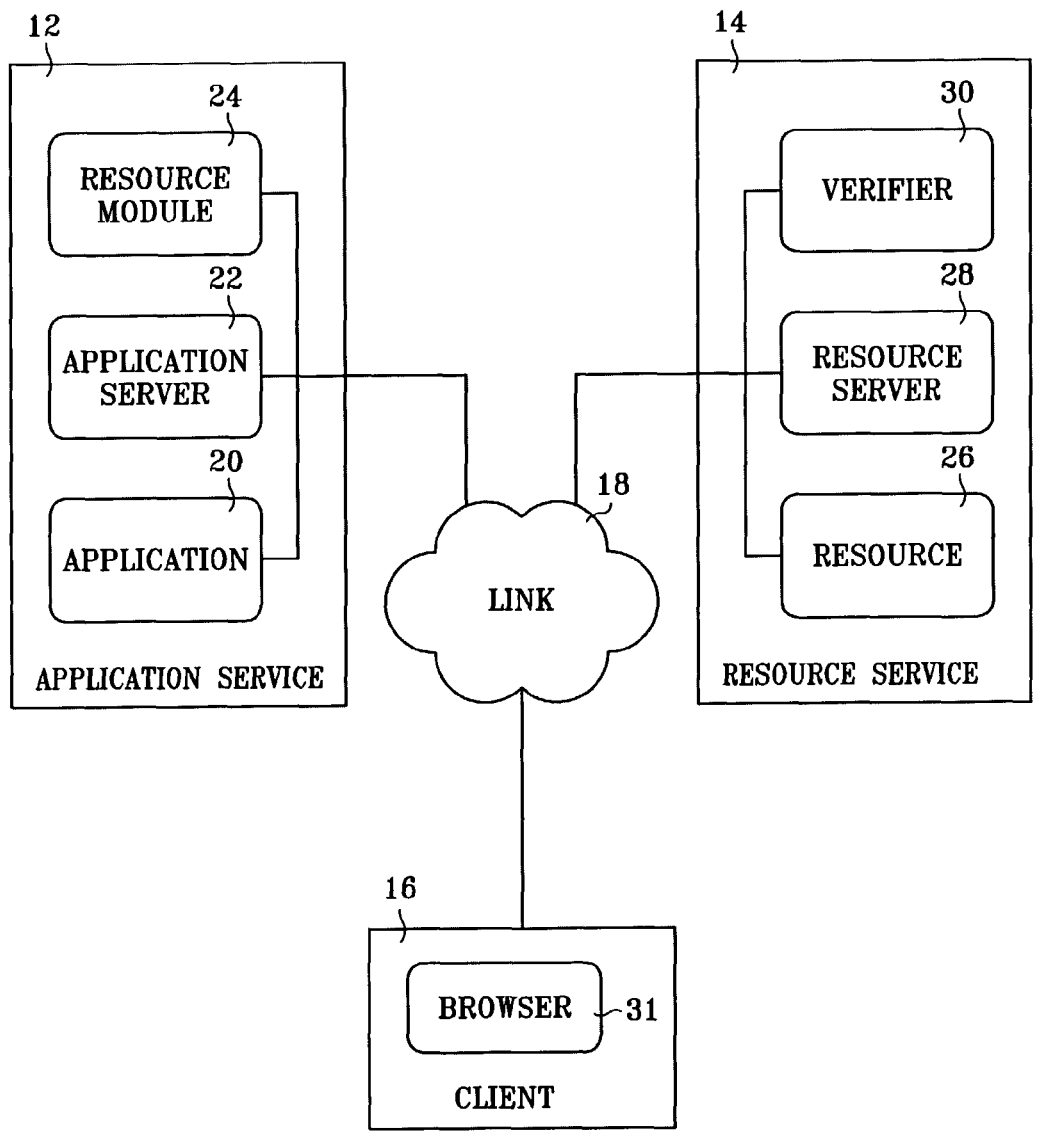
FIG. 2 is a block diagram of the network of FIG. 1 illustrating the logical program components operating on each device according to an embodiment of the present invention.

The block diagrams of FIGS. 2 and 3 show the architecture, functionality, and operation of one implementation of the present invention. If embodied in software, each block may represent a module, segment, or portion of code that comprises one or more executable instructions to implement the specified logical function(s). If embodied in hardware, each block may represent a circuit or a number of interconnected circuits to implement the specified logical function(s). While application service 12 and resource service 14 are shown as distinct components of network 10, both may operate as a single component. Moreover, individual elements of application service 12 and resource service 14 may be found on more than one device.

Also, the present invention can be embodied in any computer-readable medium for use by or in connection with an instruction execution system such as a computer/processor based system or other system that can fetch or obtain the logic from the computer-readable medium and execute the instructions contained therein. A "computer-readable medium" can be any medium that can contain, store, or maintain programs and data for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, a portable magnetic computer diskette such as floppy diskettes or hard drives, a random access memory (RAM), a read-only memory (ROM), an erasable programmable read-only memory, or a portable compact disc.

Figure 4:
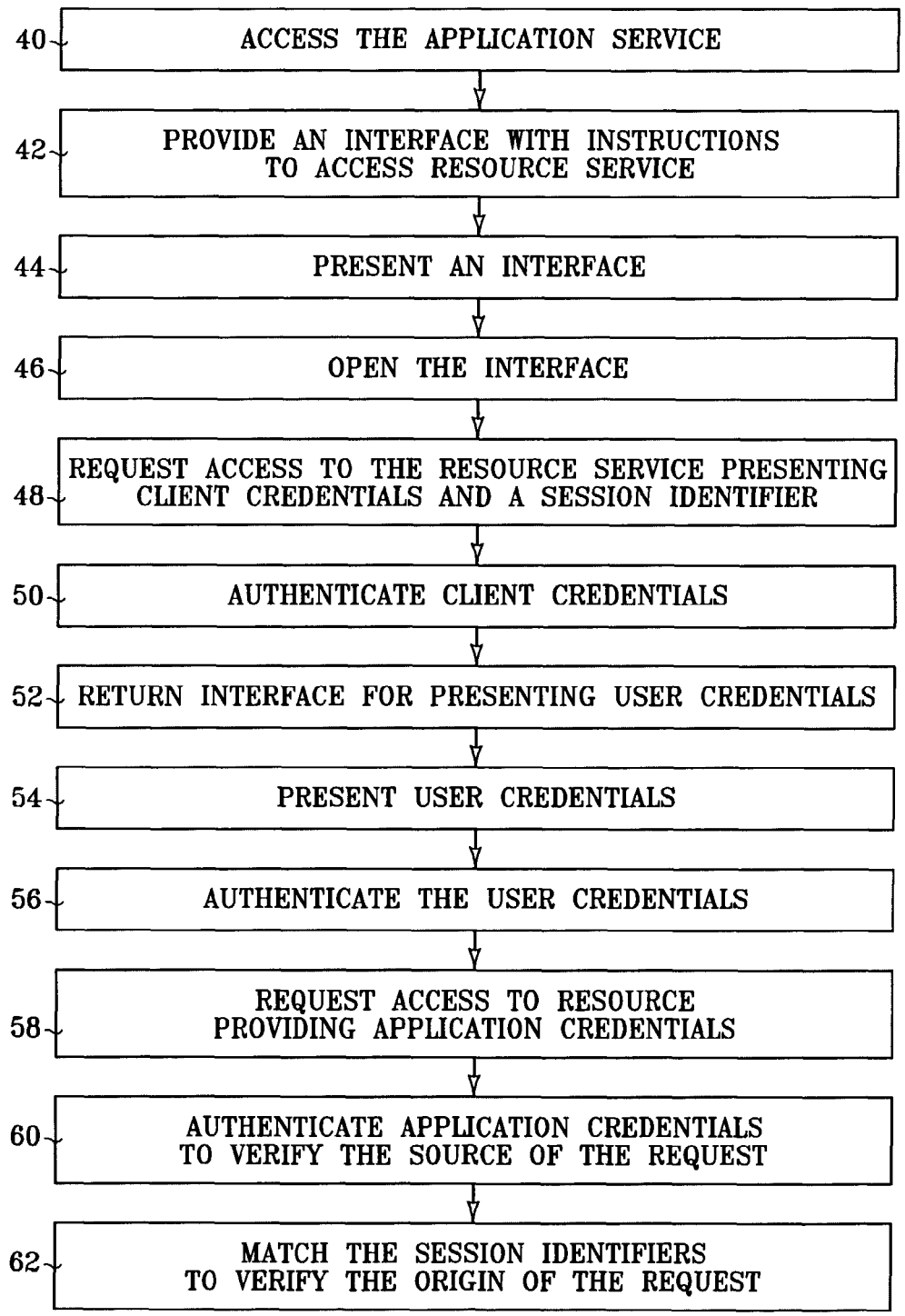
FIG. 4 is a flow diagram illustrating the initial resource access according to an embodiment of the present invention.
Figure 5:
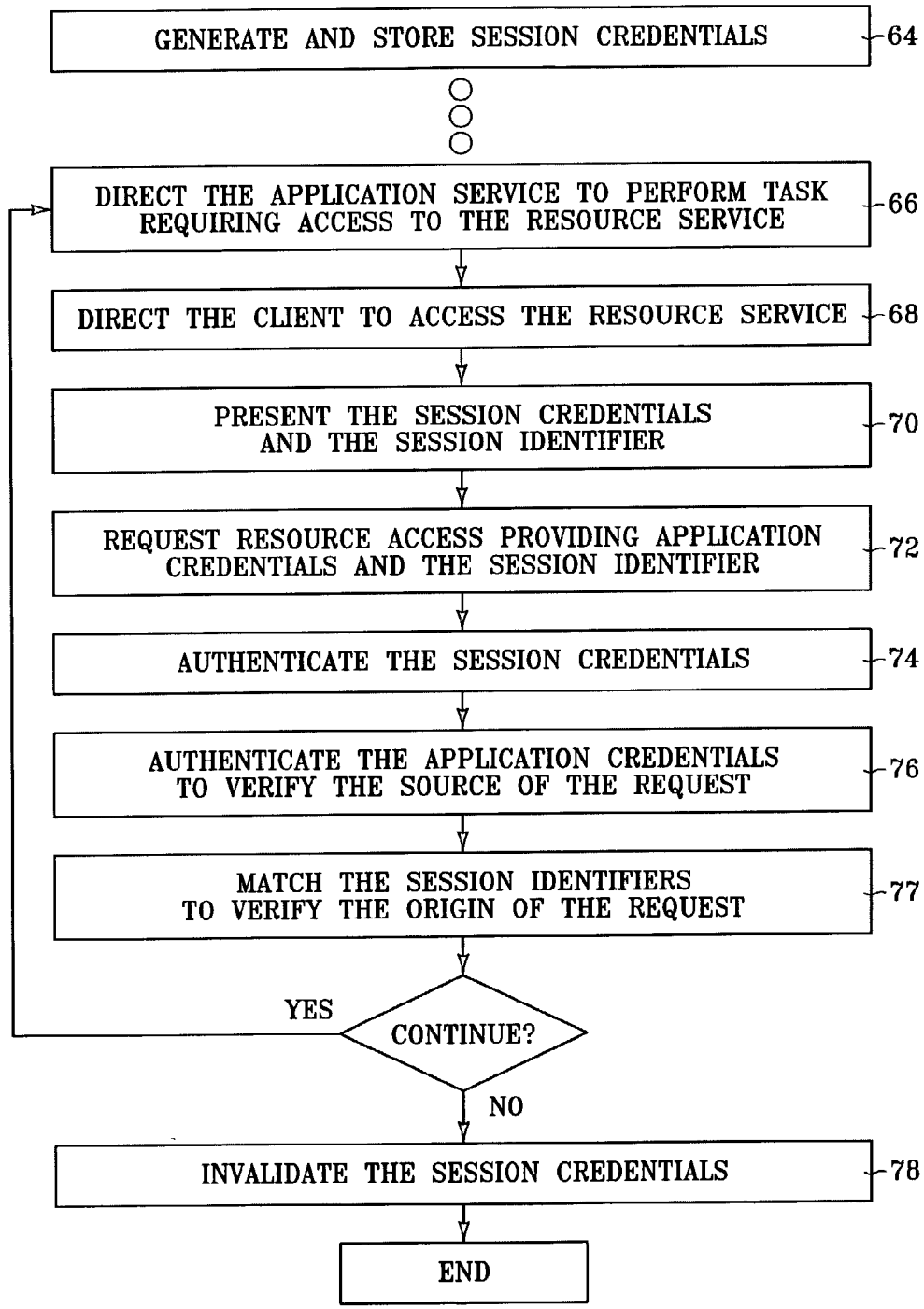
FIG. 5 is a flow diagram illustrating continued resource access according to an embodiment of the present invention.

OPERATION: The operation of the invented data access method will now be described with reference to the flow diagrams of FIGS. 4 and 5. FIG. 4 illustrates steps taken to enable application service 12 to initially obtain access to resource service 14. FIG. 5 illustrates steps taken to enable application service 12 to gain subsequent access to resource service 14.

Referring first to FIG. 4, client 16 accesses application service 12 (step 40). Typically this involves browsing to a network address established for application server 22. Application server 22 receives the request and, in response, establishes an application session and generates or otherwise provides a session interface to contain content for interacting with application 20 and possibly resource 26—the session interface also includes instructions to access resource service 14 (step 42). Application server 22 returns the session interface along with a session identifier (step 44). Due to the nature of a distributed environment, application service 12 may be presenting interfaces to any number of clients at a given time. The session identifier represents the particular application session established in response to client 16 accessing application service 12 in step 40. Client 16 opens the session interface (step 46). The session interface may, at this point, contain content for interacting with application 20. However, as resource service 14 has not been accessed, the session interface does not yet contain content for interacting with resource 26.

Upon opening the session interface, client 16 requests access to resource service 14 presenting client credentials and a session identifier (step 48). Step 48 can be accomplished in a number of ways. For example, the session interface returned in step 44 may contain content redirecting client 16, temporarily, to resource service 14. This content will likely be an URL (Uniform Resource Locator) for resource service 14 that also contains a return URL allowing resource service 14 to redirect client 16 back to application service 12.

Alternatively, the session interface may be a framed web page. A framed web page is one that divides the browser's display area into two or more sections or frames. The actual content of each frame is not provided by the framed web page itself. Rather, the framed web page provides, for each frame, a network address for accessing content to be displayed in that frame. Consequently, one of the frames in the web page returned in step 44 will include the network address of resource server 28.

Client credentials may include a digital certificate verifying the identity of client 16. Along with the client credentials, client 16 also includes a session identifier. Before responding, resource service 14 directs client verifier 34 to authenticate the client credentials (step 50).

Resource server 28 returns to client 16 interface content for presenting resource service 14 with a user's credentials (step 52). The interface content may call for manual interaction requiring the user to enter, for example, credentials in the form of a username and password. The content may instead interact with other programming on client 16 and obtain the credentials in the form of a biometric scan of the user's fingerprints or retina or it may acquire the credentials in the form of data stored on a smart card. Where the content is web content, credentials may be obtained in the form of a cookie stored on client 16. A cookie is a message given to a browser by a web server. In many cases, the browser stores the message in a text file. However, the message may be stored in volatile memory on client 16—these types of cookies are referred to as session cookies and are automatically erased when the browser session ends. The message, in many cases, is a simple alphanumeric data string unique to the given browser. The message is then sent back to the server each time the browser sends a request to the web server. In this case the cookie's message would represent the user's credentials. User credentials in whatever form are then presented to resource service 14 (step 54). User verifier 35 then authenticates the user credentials comparing the credentials against verified user credentials in database 38 (step 56).

Resource module 24 requests access to resource service 14 providing application credentials identifying application service 12 as well as the session identifier for the application session (step 58). Application credentials may include a digital certificate used to verify the identity of application service 12. Resource module 24 programmatically accesses resource service 14. This access may be accomplished using Secure Sockets Layer (SSL) which includes a provision by which both the client and the service can be authenticated. Digital certificates can be used to perform this authentication. Before granting application service 12 access to resource 26, request verifier 32 authenticates the application credentials to verify the origin of the request (step 60). Origin verifier 36 compares the session identifier presented in step 48 against the session identifier presented with the application credentials to verify the origin of the request (step 62). The session identifier is a shared secret between the client and application. This means that any transmission of the "shared secret" must be accomplished in a manner that preserves the privacy of the "shared secret". One way to accomplish this is to use SSL. When client 16 initially receives the interface from application service 12, that exchange can be made using SSL. Similarly, when client 16 is redirected to resource service 14, the request to the resource service 14 is accomplished using SSL as well.

Only where the session identifiers presented by client 16 and application service 12 match or otherwise indicate that application service 12 is operating with the awareness of client 16 and the three sets of credentials are properly authenticated in steps 50, 58, and 62, does verifier 30 grant application service 12 access to resource 26. Because access is not granted until both client 16 and the user present appropriate credentials, application service 12, beneficially, can never access resource service 14 without the user's knowledge or consent.

Referring now to FIG. 5, to enable subsequent access to resource service 14, resource service 14 generates and stores on client 16 session credentials after client verifier 34 authenticates the user credentials in step 56 (step 64). Session credentials represent data indicating that the user has initiated a session with application service 12 and has presented authenticated user credentials. It is expected that the session credentials will be invalidated following a termination event. A termination event may involve, among many other events, the user closing the session with application service 12 or the lapse of a set time period. Where resource server 28 is a web server and the session interface returned in step 44 is a web page, session credentials may take the form of a session cookie that is automatically deleted when the user closes the browser 31.

Using client 16, the user, through the session interface returned in step 44, directs application 20 to perform a specified function requiring application 20 to access resource 26 (step 66). Application server 22 directs client 16 to access resource service 14 (step 68). Client 16 accesses resource service 14 and presents the session credentials stored in step 64 (step 70). Application service 12 requests access to resource service 14 presenting application credentials (step 72). User verifier 35 authenticates the session credentials (step 74). Request verifier 32 authenticates the application credentials to verify the source of the request (step 76). Origin verifier 36 compares the session identifier presented in step 70 against the session identifier presented with the application credentials to verify the origin of the request (step 77). Only where the session credentials and the application credentials are properly authenticated and the session identifiers matched, does verifier 30 grant application 20 access to resource 26.

If the user chooses to continue, the process repeats with step 66. Otherwise, the session credentials are invalidated (step 78) and the process ends. To enable application service 12 to once again access resource service 14, the user must repeat the process illustrated in FIG. 4.

Figure 6:
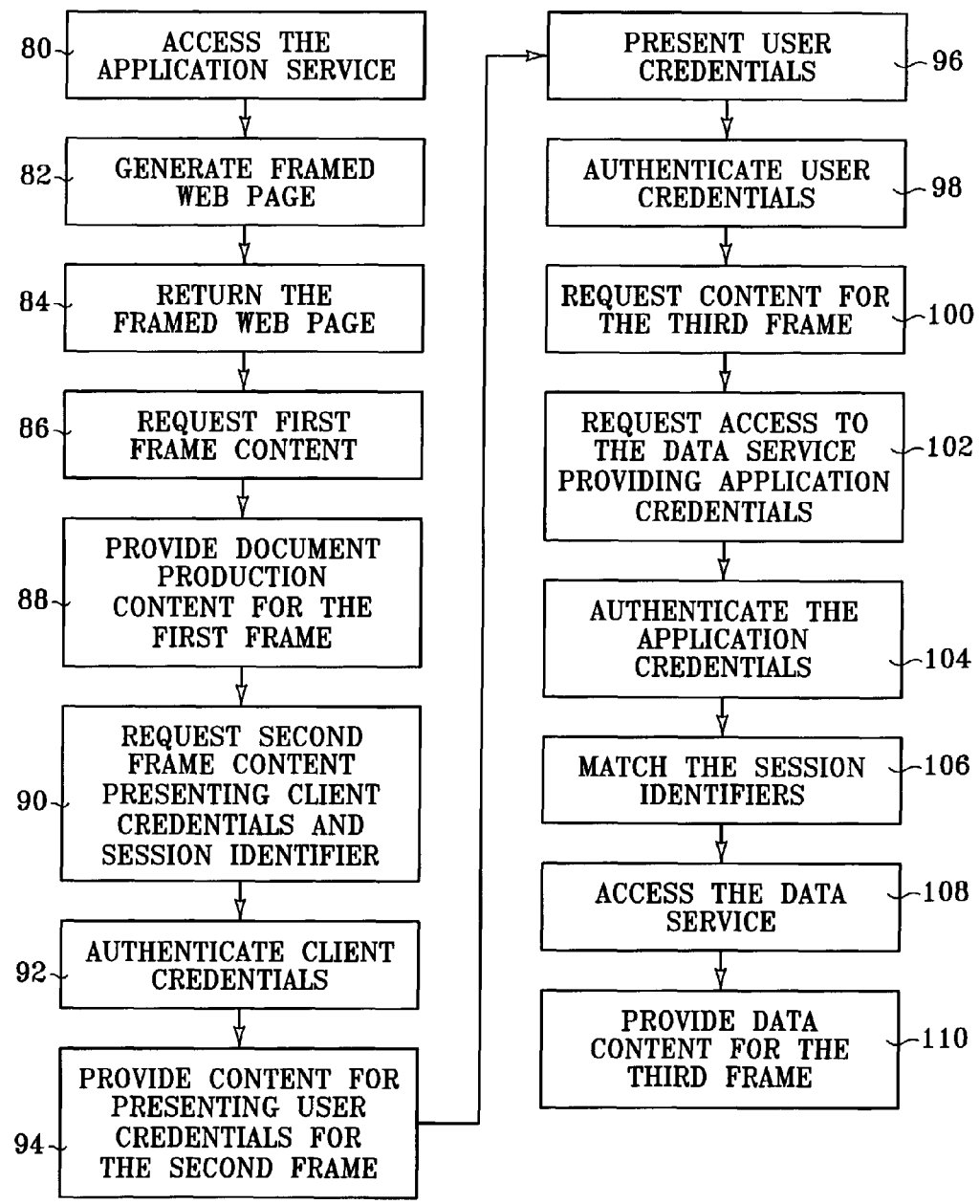
FIGS. 6 and 8 are flow diagrams of an implementation the present invention illustrating the steps taken to produce electronic documents.
Figure 7:
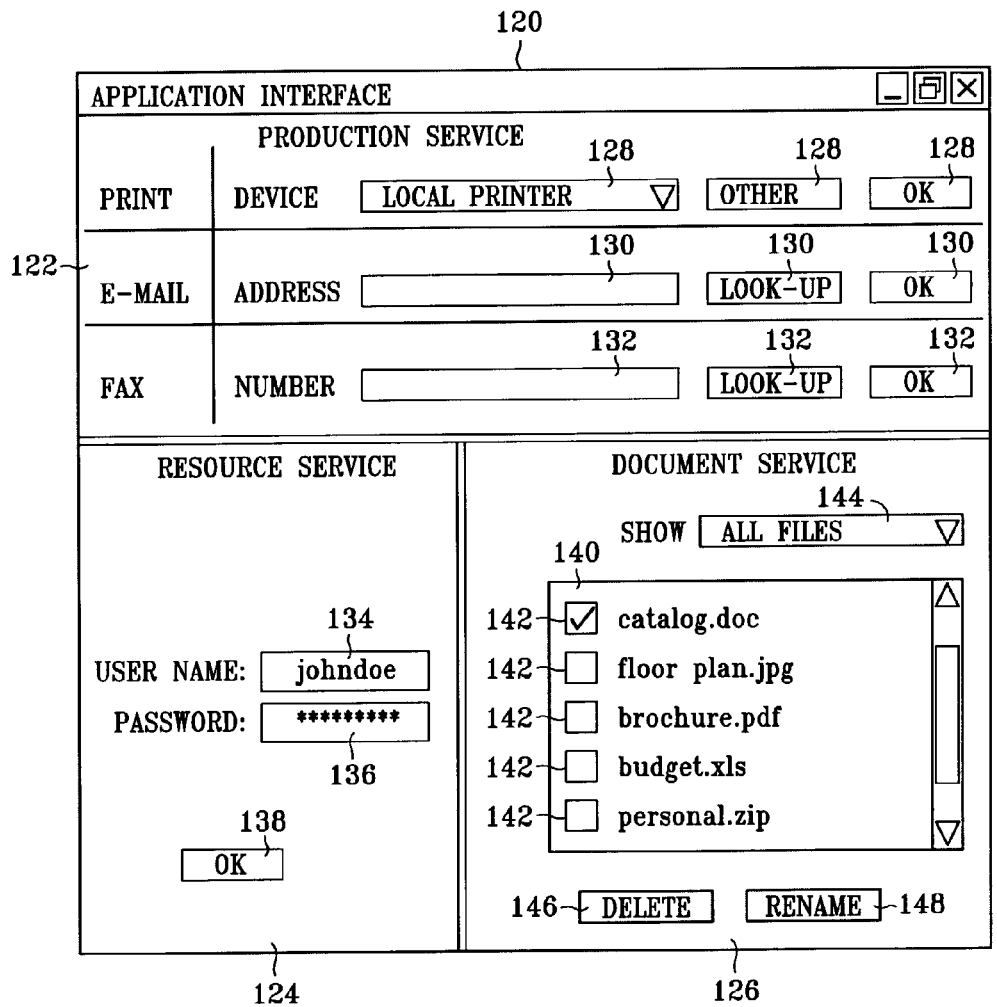
FIG. 7 is an exemplary screen view of an interface for producing electronic documents generated according to the flow diagram of FIG. 6.
Figure 8:
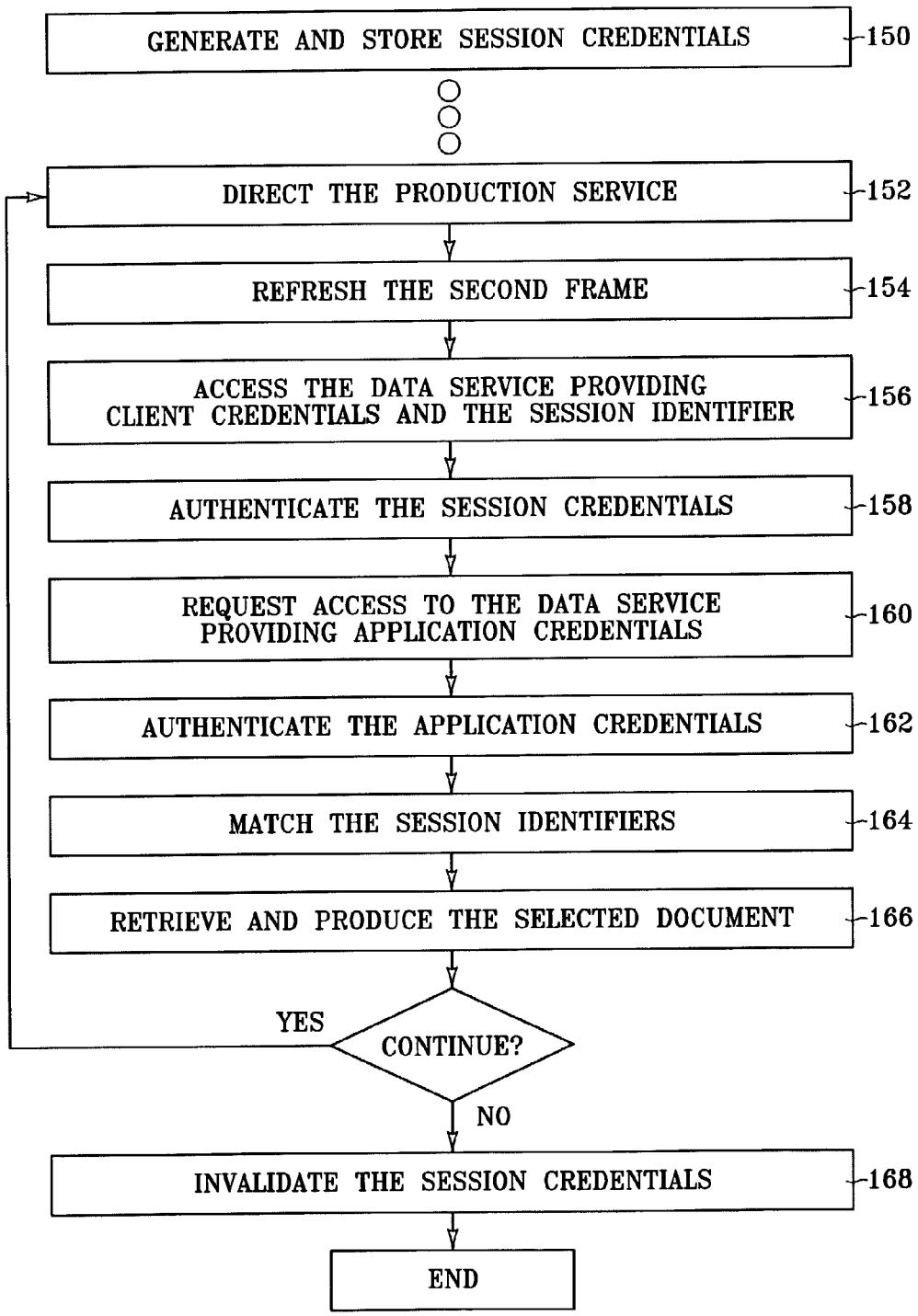

FIGS. 6-8 help to illustrate a particular implementation of the present invention. In this example, application service 12 is a document production service and is referred to production service 12. Resource service 14 is a data service managing one or more electronic documents for a user and is referred to as data service 14. The goal is to provide production service 12 secure but limited access to electronic documents managed by the data service 14. FIG. 6 is a flow diagram illustrating steps taken to provide production service 12 access to data service 14 and to provide an interface for producing a selected document. FIG. 7 is an exemplary screen view of such an interface. FIG. 8 is a flow diagram illustrating steps taken to provide production service 12 continued access to data service 14.

Beginning first with FIG. 6, browser 31, through a user's guidance, requests access to document production service 12 browsing to a network address assigned to application server 22 (step 80). In response, application server 22 establishes an application session and generates a session interface in the form of a framed web page having three frames (step 82)—one frame to contain content for selecting production options (production content), a second frame to contain content for presenting client and user credentials to data service 14, and a third frame to contain content enabling a user to identify and select a document managed by data service 14 (document content). Application server 22 then returns the framed web page to browser 31 (step 84). The framed web page has a unique URL that not only identifies application server 22 but also identifies a particular application session established for the user for interacting with application 20. Take, for example, the URL "https://www.productionservice.com/default-?session=12345." The portion "www.productionservice.com/default" identifies and enables access to application server 22. The portion "?session=12345" identifies the session and is referred to below as a session identifier. The "https" portion indicates the protocol, which in this case is HTTP using SSL. The session data can be provided ways other than in the URL. The session could also be provided as a variable within the HTML document.

Browser 31 requests, from production service 12, production content for the first frame (step 86). Application server 22 responds providing the requested content (step 88). Browser 31 requests content for the second frame from data service 14, and, in doing so, presents data service 14 with client credentials and the session identifier (step 90). Resource server 28 receives the request and instructs client verifier 34 to authenticate the client credentials (step 92). Resource server 28, then, provides content for the second frame enabling the user to supply user credentials (step 94). The content may allow the user to manually enter a user name and password. The content may be programmatically capable of obtaining user credentials from a smart card or biometric scanner accessible to browser 31 or client 16. Through whichever means available, browser 31 presents the user credentials to data service 14 (step 96). Resource server 28 receives and instructs user verifier 35 to authenticate the user credentials (step 98).

Browser 31 requests data content for the third frame (step 100). Application server 22 receives the request and directs resource module 24 to request access to data service 14 (step 102). Included in resource module's request are application credentials and the session identifier for the application session established in step 82. Resource server 28 receives the request and directs request verifier 32 to authenticate the application credentials (step 104) and origin verifier 36 to compare the session identifier presented by browser 31 with the identifier presented by resource module 24 (step 106).

Where the application credentials are authenticated and the session identifiers matched, verifier 30 grants production service 12 access to the user's electronic documents managed by data service 14 (step 108). Application server 22 then provides document content for the third frame (step 110).

FIG. 7 is an exemplary screen view of a framed web page 120 provided in step 82 and displaying content provided in steps 88, 94, and 110. Web page 120 includes first frame 122, second frame 124, and third frame 126. First frame 122 contains controls, displayed according to the production content provided in step 88, for interacting with application 20. Second frame 124 contains controls for presenting user credentials according to the content provided in step 94. Third frame 126 contains controls, displayed according to the document content provided in step 110, for selecting and managing electronic documents managed by data service 14.

When providing the production content for first frame 122, application server 22 includes controls 128-132 for printing, e-mailing, faxing, and archiving a file or files selected in fame 126. Using controls 128, a user can instruct application 20 to print a selected document. Using controls 130 or 132, the user can instruct application 20 to send the selected document to a particular e-mail address or fax the document to a particular number.

When providing content for second frame 124, resource server includes controls 134-138 enabling a user to manually provide user credentials. Controls 134 and 136 enable the user to enter a user name and password while control 138 allows the user to instruct browser 31 to present or return the user credentials to data service 14.

When providing the data content for third frame 126, application server 22 includes a scroll menu 140 displaying electronic documents managed by data service 14. In this example scroll menu 140 includes check boxes 142 allowing the user to select one or more of the displayed documents. Here, the document "catalog.doc" has been selected. Also included is pull down menu 144 and command buttons 146 and 148. Pull down menu 144 allows a user to select the type of files displayed in scroll menu 140. In this example "all files" is selected. A user may, however, desire to show only word processor documents or spreadsheets. Command buttons 146 and 148 allow a user to perform tasks such as deleting or renaming documents selected in scroll window menu 140.

Referring now to FIG. 8, after user verifier 35 authenticates the user credentials in step 98, resource server 28 generates and stores on client 16 session credentials to enable subsequent access to data service 14 (step 150). It is expected that the session credentials will be a cookie to be invalidated following a termination event. A termination event may involve, among many other events, the user closing the session with production service 12 or the lapse of a set time period.

A user enters production options for producing a selected document. Browser 31 returns the user's selections directing production service 12 to produce the selected document accordingly (step 152). In turn, production service 12, instructs browser 31 to refresh the second frame 124 (step 154). In response, browser 31 once again requests access to data service 14 presenting client credentials, the session identifier, and the session credentials stored in step 150 (step 156). Resource server 28 receives the request and directs client verifier 34 to authenticate the client credentials and the session credentials (step 158).

Providing application credentials and the session identifier, resource module 24 requests access to data service 14 to retrieve the selected document (step 160). Resource server 28 receives the request and directs request verifier 32 to authenticate the application credentials (step 162) and origin verifier 36 to match the session identifier presented by resource module 24 with the session identifier presented by client 16 in step 156 (step 164).

Where the application credentials are properly authenticated and the session identifiers matched, verifier 30 allows production service 12 to retrieve and then produce the selected document (step 166). If the user chooses to continue and select and produce another document, the process repeats with step 152. Otherwise, the session credentials are invalidated (step 168) and the process ends. To enable production service 12 to once again access data service 14, the user must repeat the process illustrated in FIG. 6.

Although the flow charts of FIGS. 4, 5, 6, and 8 show a specific order of execution, the order of execution may differ from that which is depicted. For example, the order of execution of two or more blocks may be scrambled relative to the order shown. Also, two or more blocks shown in succession may be executed concurrently or with partial concurrence. All such variations are within the scope of the present invention. The screen display of FIG. 7 is exemplary only. There exist many possible layout and control configurations for interfaces that will allow a user to direct production service 12 while selecting electronic documents managed by data service 14. FIG. 7 merely provides one such example.

The present invention has been shown and described with reference to the foregoing exemplary embodiments. It is to be understood, however, that other forms, details, and embodiments may be made without departing from the spirit and scope of the invention which is defined in the following claims.

What is claimed is:

1. In a computer network, a method for granting a request from a first resource to access a second resource comprising a circuit, said method comprising:

with said second resource, receiving a session request to access the second resource in a new session;

verifying that the request was received from the first resource;

for each individual session request received, verifying that an authorized client directed the first resource to request access to the second resource; and authenticating credentials presented for the client;

wherein, for each individual session request for access by the first resource to the second resource, access is granted only for an individual request that is verified as having been initiated by said client.

2. The method of claim 1, wherein the act of verifying that the request was received from the first resource comprises authenticating credentials for the first resource presented with the received request.

3. The method of claim 2, wherein the request to access the second resource includes a digital certificate, and wherein authenticating credentials for the first resource comprises verifying that the digital certificate identifies the first resource.

4. The method of claim 1, wherein the act of verifying that the client directed the first resource to request access comprises receiving a session identifier from a client, receiving a session identifier from the first resource, and verifying that the received session identifiers match.

5. The method of claim 4, wherein the act of verifying that the client directed the first resource to request access further comprises receiving credentials from the client, the credentials uniquely identifying the client or a user, and authenticating those credentials.

6. The method of claim 5, wherein communications between the first resource and the second resource and between the client and the second resource are encrypted for privacy.

7. The method of claim 6, wherein encryption is accomplished utilizing secure sockets layer protocol.

8. A non-transitory computer readable medium having instructions for:

at a second resource, receiving a session request from a first resource to access said second resource;

verifying that the request was received from the first resource;

for each individual session request received from said first resource to access said second resource, verifying that a client operated by an authorized user directed the first resource to make that individual request to access to the second resource;

authenticating credentials presented for said user; and, if and only if an individual request is verified as having been initiated by a client operated by said authorized user, granting that individual request for the first resource to access the second resource.

9. The medium of claim 8, wherein the instructions for verifying that the request was received from the first resource comprise instructions for authenticating credentials for the first resource presented with the received request.

10. The medium of claim 8, wherein the instructions for verifying that the client directed the first resource to request to access comprise instructions for matching a session identifier presented by the client to the second resource independently of the first resource with a session identifier presented by the first resource.

11. The medium of claim 10, wherein the instructions for verifying that the client directed the first resource to request to access further comprise instructions for authenticating credentials presented for the client.

12. A resource service with an authentication system to operate on a computer network, comprising:

a resource server comprising a circuit;

a resource operated by said resource server; and a verifier for verifying each individual session request from a second resource on said computer network to access said resource service is made under instructions from an authorized user that is authorized to use said resource service, said verifier comprising;

a request verifier operable to verify that the request was received from the second resource;

an origin verifier operable to verify, for each individual session request from said second resource, that a client associated with said authorized user directed the second resource to request to access to the resource service; and a gate keeper operable to grant a request to access the resource service only where the request verifier and the origin verifier each verify that individual request.

13. The resource service of claim 12, wherein said origin verifier is further operable to receive separately, within an individual request for said second resource to access said resource service, session credentials from both said second resource and from said client, said origin verifier verifying that individual request to said gate keeper only if said session credentials from said second resource match said session credentials from said client.

14. The resource service of claim 13, further comprising said second resource, wherein said second resource instructs said client to send said session credentials of said client to said resource service as part of said individual request for said second resource to access said resource service.

15. The resource service of claim 12, wherein said resource service provides session credentials to said client upon authentication of said request.

16. The resource service of claim 15, wherein said session credentials are automatically invalidated upon a termination event.

17. The resource service of claim 15, wherein said session credentials are incorporated in a session cookie provided by said resource service to said client.

18. The resource service of claim 12, further comprising said client, wherein said client is operable to display a webpage with a first frame comprising an interface for said resource server and a second frame comprising an application interface for an application on said second resource.

19. The resource service of claim 18, wherein said first frame comprises a frame for providing user credentials to said resource server.

20. The resource service of claim 18, wherein said webpage has a unique Uniform Resource Locator (URL) that identifies a particular session established between the client and the second resource.

21. The resource service of claim 18, wherein a Hyper Text Markup Language (HTML) document for said webpage comprises a session identifier that identifies a particular session established between the client and the second resource.

* * * * *